US010311760B1

(12) United States Patent
McMahon et al.

(10) Patent No.: US 10,311,760 B1
(45) Date of Patent: Jun. 4, 2019

(54) INFRARED INK LABELING SYSTEM

(71) Applicant: AMAZON TECHNOLOGIES, INC., Seattle, WA (US)

(72) Inventors: Nicholas Charles McMahon, Bolton, MA (US); Tomer Anor, Brookline, MA (US); Jeremy Samuel De Bonet, Southborough, MA (US); Oded Maron, Sudbury, MA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/707,933

(22) Filed: Sep. 18, 2017

Related U.S. Application Data

(60) Provisional application No. 62/513,125, filed on May 31, 2017.

(51) Int. Cl.
| | | |
|---|---|---|
| *B41J 2/02* | (2006.01) | |
| *B41J 2/21* | (2006.01) | |
| *B41M 3/14* | (2006.01) | |
| *G09F 3/00* | (2006.01) | |
| *G09F 3/02* | (2006.01) | |

(Continued)

(52) U.S. Cl.
CPC ............. *G09F 3/0297* (2013.01); *B41J 2/02* (2013.01); *B41J 2/2107* (2013.01); *B41J 3/4075* (2013.01); *B41M 3/14* (2013.01); *B41M 3/144* (2013.01); *C09D 11/328* (2013.01); *G06Q 10/08* (2013.01); *G09F 2003/0213* (2013.01)

(58) Field of Classification Search
CPC .......... G09F 3/0297; G09F 2003/0213; B41M 3/144; B41M 3/14; G06Q 10/08; C09D 11/328; B41J 2/2107; B41J 3/4075; B41J 2/02
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| | (Continued) | |

OTHER PUBLICATIONS

Fabricolor 8082 Datasheet [online]. Fabricolor Holding International LLC [retrieved on Jul. 22, 2018]. Retrieved from the Internet <URL: http://www.fabricolorholding.com/product.php?id=688>.*

(Continued)

*Primary Examiner* — Julian D Huffman
(74) *Attorney, Agent, or Firm* — Lindauer Law, PLLC

(57) ABSTRACT

An ink that is detectable using infrared (IR) light may be used to apply machine readable codes, such as a barcode. The indicia, once applied, may be either invisible or difficult to detect with visible light, such as with the human eye. The ink may include one or more materials such as titanium dioxide ($TiO_2$), particles of acrylonitrile butadiene styrene (ABS), metals, and so forth. These materials may be used to enhance one or more of the reflectivity to IR light or the fluorescence of the ink under IR light. The fluorescent ink may be deposited in a single pass, or as part of a two-pass process in which a reflective substrate, such as a resin with encapsulated $TiO_2$, is applied and then the fluorescent ink is deposited atop the substrate. The markings are machine readable even when overprinting markings that are readable under visible light.

20 Claims, 8 Drawing Sheets

(51) Int. Cl.
*B41J 3/407* (2006.01)
*G06Q 10/08* (2012.01)
*C09D 11/328* (2014.01)

(56) References Cited

U.S. PATENT DOCUMENTS

| | | | |
|---|---|---|---|
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 2003/0108689 | A1* | 6/2003 | Tan ................ B41M 3/144 428/29 |
| 2011/0011936 | A1 | 1/2011 | Morandi et al. |
| 2011/0258924 | A1* | 10/2011 | Van Asbrouck ............ G06K 19/06009 47/57.6 |
| 2012/0284132 | A1 | 11/2012 | Kim et al. |
| 2013/0284806 | A1 | 10/2013 | Margalit |
| 2013/0323476 | A1* | 12/2013 | Farrell ................ B42D 25/29 428/195.1 |
| 2015/0086107 | A1 | 3/2015 | Dedeoglu et al. |

OTHER PUBLICATIONS

Fabricolor 80821 Datasheet [online]. Fabricolor Holding International LLC [retrieved on Jul. 22, 2018]. Retrieved from the Internet <URL: http://www.fabricolorholding.com/product.php?id=732>.*

Asthana, et al., "An Indoor Wireless System for Personalized Shopping Assistance", CiteSeerX, In Proceedings of IEEE Workshop on Mobile Computing Systems and Applications, 1994. Retrieved from the Internet: <URL:http://citeseerxist.psu.edu/viewdoc/summary?doi=10.1.1.127.3033>.

<Kalnikaite, et al., "How to Nudge in Situ:Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from the Internet<URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

INFRARED INK LABELING SYSTEM

PRIORITY

This application claims priority to U.S. Provisional Patent Application Ser. No. 62/513,125, filed on May 31, 2017, entitled "Infrared Ink Labeling System", that is hereby incorporated by reference in its entirety.

BACKGROUND

Retailers, wholesalers, warehouse operators, shippers, and other product handlers typically maintain an inventory of or track various items that may be ordered, purchased, leased, borrowed, rented, viewed, shipped, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from the inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DESCRIPTION

Figure 1:
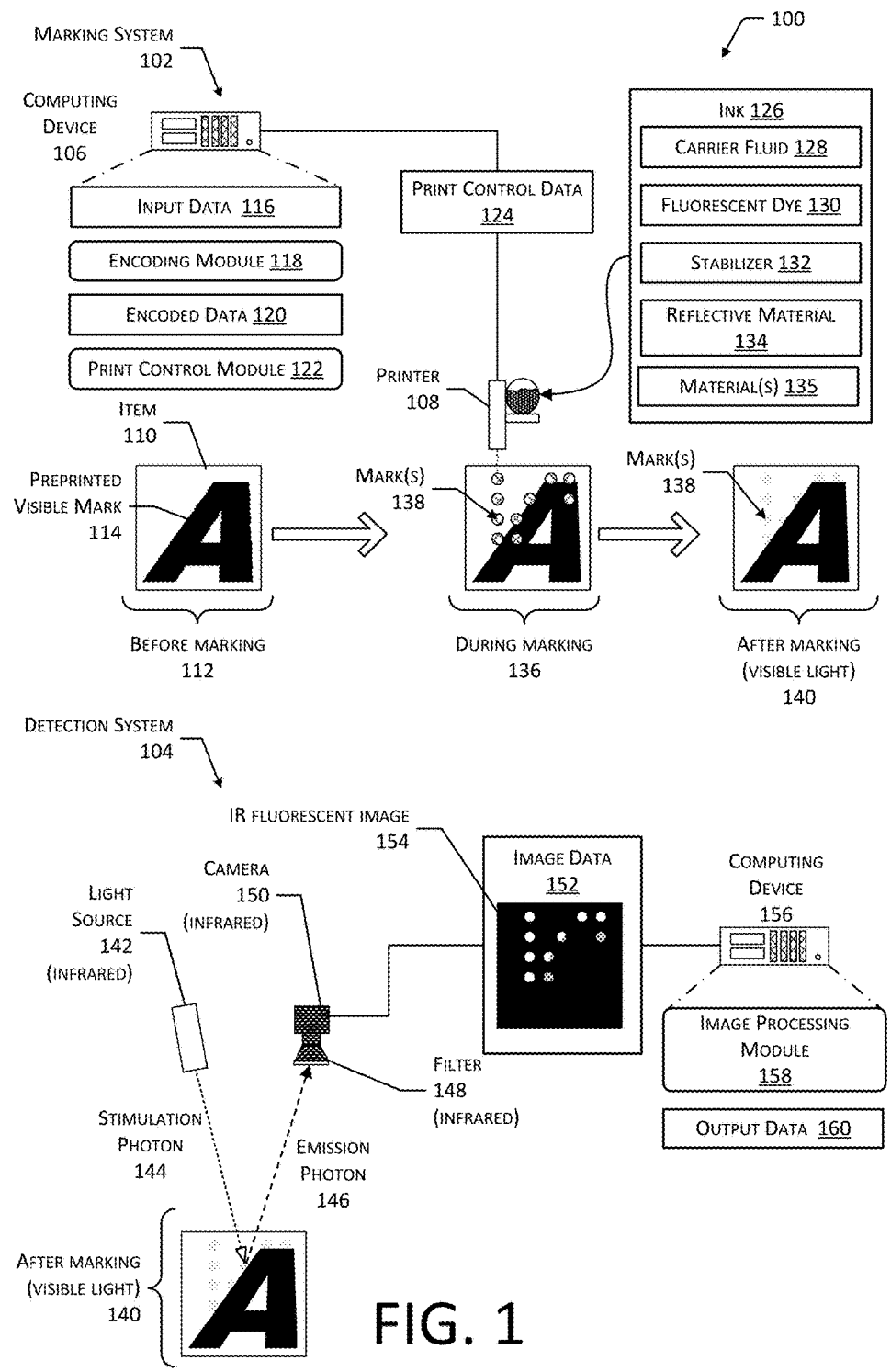
FIG. 1 illustrates a system 100 that includes a marking system to produce marks that are invisible or minimally visible to human eyes, and a detection system for these marks, according to some implementations.

FIG. 1 illustrates a system 100 that includes a marking system to produce marks on an item that are invisible or minimally visible to human eyes, and a detection system for these marks, according to some implementations. The marks and the detection system allow for the reliable detection and decoding of these marks at various distances, such as in excess of two meters. Additionally, the marks are readable even when the underlying surface of the item contains other markings that are visible to human eyes.

The system 100 may include a marking system 102 and a detection system 104. The marking system 102 may include a computing device 106. The computing device 106 may comprise a server, desktop computer, dedicated controller, and so forth. The computing device 106 is in communication with a printer 108. For example, the computing device 106 may be connected to the printer 108 using a serial interface, Ethernet connection, and so forth.

Before marking 112, an item 110 is shown with a preprinted visible mark 114. The item 110 may comprise a container such as a bag, box, can, foodstuffs, and so forth. For example, the item 110 may comprise a box of cereal, an individual piece of fruit such as an apple, and so forth. For various purposes, including identification, marketing, and so forth, the item 110 may have one or more preprinted visible marks 114, such as a brand name, logo, and so forth that have been previously applied. For example, during manufacture of the box or other packaging used for the item 110, inks that produce a mark readable in visible light may be printed on the exterior surface of the box. In other implementations other techniques may be used to produce the preprinted visible mark 114, such as laser marking, engraving, application of labels, and so forth. Visible light may be representative of light having a wavelength of between 400-700 nanometers (nm). Infrared (IR) light, in comparison exhibits wavelengths of about 700 nm to 1 millimeter (mm), while ultraviolet (UV) light exhibits wavelengths of about 10 nm to 400 nm.

During operation of the marking system 102, the computing device 106 may accept as input or access from memory input data 116. The input data 116 may comprise information indicative of one or more of an identification number, stock keeping unit (SKU) number, serial number, date of manufacture, expiration date, vendor code, source code, destination code, lot number, batch number, special handling instructions, and so forth.

An encoding module 118 of the computing device 106 may accept the input data 116 and provide encoded data 120 to a print control module 122. For example, the encoded data 120 may include information representative of the input data 116 as well as parity bits, conversion to a particular format, and so forth. For example, the encoded data 120 may comprise information representative of the coloring and shape for particular elements within a two-dimensional machine-readable code. Continuing the example, the encoded data 120 may describe a 4×5 matrix, with each matrix element being either blank, a circle, or a square. The arrangement and type of these matrix elements may thus serve to represent the input data 116. In other implementations, the encoded data 120 may describe an 8×8 matrix.

The print control module 122 may accept as input the encoded data 120 and generates print control data 124. For example, the print control data 124 may comprise a set of instructions that direct operation of the printer 108 to apply an ink 126 in a particular fashion. Continuing the example, the print control data 124 may direct a printhead of the printer 108 to emit a particular quantity of the ink 126 for a particular duration of time at a particular location.

The ink 126 may comprise a carrier fluid 128, a fluorescent dye 130 that includes one or more fluorophores, a stabilizer 132, a reflective material 134, or other material(s) 135. In other implementations, other formulations of ink 126 may be utilized. For example, one or more of the stabilizer 132 or the reflective material 134 may be omitted. In one implementation, the fluorescent dye 130 may have a concentration of between 0.03% and 0.05% for the ink 126. For example, the ink 126 may comprise 0.05% by weight of the ink 126.

The carrier fluid 128, also known as a "vehicle" may be used to transport the other components of the ink 126. The carrier fluid 128 may comprise one or more of water, alcohol, methyl ethyl ketone (MEK), and so forth. In some implementations the carrier fluid 128 may be omitted and the ink 126 may comprise a powder or solid material.

The fluorescent dye 130 comprises a fluorescent material that has fluorophores which interacts with an incident stimulation photon and then subsequently releases an emission photon. For example, the fluorescent dye 130 may comprise Fabricolor dye 80821 that fluoresces under IR light. Fabricolor dyes are available from Fabricolor Holding International LLC of Paterson, N.J., United States of America. In other implementations, other dyes may be used.

In some implementations, instead of, or in addition to dyes, the ink 126 may include quantum dots. For example, the quantum dots may comprise nanometer size particles of a semiconductor material.

The fluorescent dye 130 fluoresces when stimulated by photons having a wavelength of between 800 and 830 nm. For example, a stimulation photon having a wavelength of about 810 nm may produce an emission photon. The emission photon may have a wavelength of between 840 nm and 860 nm. For example, when excited by a stimulation photon having a wavelength of 810 nm, the fluorescent dye 130 may fluoresce and produce an emission photon with a wavelength of about 850 nm.

The stabilizer 132 may be designed to stabilize one or more of the other components of the ink 126. The stabilizer 132 may reduce photodegradation of the fluorescent dye 130 caused by various wavelengths of light, such as one or more of IR, visible, or ultraviolet. For example, the stabilizer 132 may comprise a material that is absorptive of UV light, such as the TINUVIN 328 stabilizer from BASF Corporation of Florham Park, N.J., United States of America. Continuing the example, the stabilizer 132 may absorb at least a portion of incident UV light, reducing photodegradation of the ink 126. In some implementations, the stabilizer 132 may comprise between 2-3% of the ink 126 as measured by weight.

The reflective material 134 may comprise one or more materials that reflect incident non-visible light, such as infrared (IR) light. For example, the reflective material 134 may be reflective to wavelengths of between 800 and 870 nm. The reflective material 134 may be reflective to at least 30% of the photons within these wavelengths. In one implementation, the reflective material 134 may comprise rutile titanium dioxide ($TiO_2$) particles. In other implementations, other forms of titanium dioxide may be utilized, such as anatase titanium dioxide. Other materials may be used, including mixed metal oxides (MMO), complex inorganic colored pigments (CICP), and so forth. For example, the reflective material 134 may comprise a pigment from the Arctic line of pigments Shepherd Color Company of Cincinnati, Ohio.

The size of molecules of a dye may be very large in comparison to the size of pigment molecules. Dyes may provide color on a principle of selective wavelength absorption while pigments may provide color as a result of light scattering and selective wavelength absorption. Dyes may be organic molecules that incorporate one or more carbon atoms. However, some pigments may include carbon. For example, carbon black comprises carbon and is considered a pigment. Dyes may be soluble in water, while pigments may be insoluble in water. However, some dyes may be insoluble in water while some pigments may be soluble in water. For example, lake colors are insoluble in water while anthocyanins are water soluble.

The particles in the reflective material 134 may be reflective to infrared (IR) light by way of one or more of a diffractive mode or a refractive mode. In some implementations reflection may occur via other modes. In one implementation, the titanium dioxide particles may have an average size of between 405 nanometers (nm) and 425 nm when configured to operate with infrared (IR) light having a wavelength of between about 810 nm and 850 nm. Other materials may be used as well. For example, the particle may be metallic having an average size of between 405 nm and 425 nm. In other implementations the particles may be smaller. For example, the particles may have an average size that is less than 425 nm. The reflective material 134 may improve performance by reflecting one or more of the stimulation photons or the emission photons.

The ink 126 may include one or more other materials 135, such as resin, polyurethane, bisphenol A diglycidyl ether, silicone, and so forth. These materials may improve the overall fluorescence of the marks 138. For example, the material 135 may comprise a resin that improves insulation of the fluorescent dye 130 molecules, providing an increased layer thickness that increases the probability of successful fluorescent excitations and emissions, such as described below.

The material 135 may be transparent or translucent to infrared light. For example, the material 135 may include a resin that is soluble in an organic solvent, such as MEK. Resins may include, but are not limited to, acrylonitrile butadiene styrene (ABS), poly(methyl methacrylate) (PMMA), styrene acrylonitrile (SAN), polyethylene terephthalate (PET), polyether ether ketone (PEEK), and so forth.

As shown in FIG. 1, during marking 136 the printer 108 deposits ink 126 on an exterior surface of the item 110 to produce one or more indicia or marks 138. The printer 108 may utilize a printhead that allows for controlled placement of a particular quantity of ink 126 in a particular spatial location, suitable to form the mark 138. For example, the printer 108 may utilize a continuous inkjet (CU) printhead. The CIJ printhead sprays the ink 126 from a nozzle in a continuous stream, with the stream subsequently being broken into sections. The ink droplets are then electrostatically charged, and placement of the charged droplets of ink 126 are then controlled using electrostatic deflection. Unused drops are caught by a gutter and then recycled. Additional carrier fluid 128 may be added to replenish the carrier fluid 128 lost during the cycle through the printhead.

The marks 138 may be printed on one or more surfaces of the item 110. The surfaces of the item 110 may be flat or curved. For example, the item 110 may comprise a cylindrical can and the marks 138 may be printed on the side. For applications involving printing on foodstuffs, the ink 126 may be formulated to be safe for consumption.

In another example, the printer 108 may utilize a printhead using drop-on-demand (DOD). For example, a piezoelectric DOD system may utilize a piezoelectric material in a chamber filled with ink 126. When activated, the piezoelectric material changes shape and produces a pressure pulse in the ink 126, displacing a drop of ink 126 from the nozzle. Other types of printhead may be used by the printer 108.

In other implementations, other techniques may be used to apply the marks 138. For example, a roller, stamp, plate, transfer web, ribbon, and so forth may be used to apply the ink 126 to the surface of the item 110.

The marks 138 are shown after marking as apparent in visible light 140. The composition of the ink 126 and the density of the mark 138 as printed are such that the mark 138 is either minimally visible or invisible to the human eye under visible light under levels of illumination typical for use. Density indicates the quantity of ink 126 that is applied per unit area on the surface of the item 110. For example, a mark 138 that has been stippled or includes a pattern has a density that is less than a solid mark. In this illustration, the marks 138 appear faintly visible for sake of illustration, and not necessarily as a limitation.

Once printed with the marks 138 encoding the input data 116, the item 110 may be otherwise handled. For example, the item 110 may be placed on shelves, hung from hangers, or otherwise arranged within a facility so that users are able to retrieve the item 110.

The detection system 104 is utilized to read the marks 138 and provide information about the data the mark 138 encodes. The detection system 104 may include a light source 142. The light source 142 provides stimulation photons 144 that are used to elicit fluorescence from the ink 126 that comprises the marks 138. The light source 142 may include a laser, light emitting diode, incandescent bulb, fluorescent bulb, and so forth. For example, the light source 142 may comprise a 500 milliwatt (mW) laser diode emitting at 808 nm, with the output diffused using a 120 grit ground glass diffuser. The stimulation photon 144 interacts with a fluorophore in the fluorescent dye 130 and emits an emission photon 146. For example, the emission photon 146 may exhibit a wavelength of about 850 nm.

The light source 142 may be configured to utilize pulsed operation. For example, the light source 142 may generate pulses with a 400 microsecond (μs) duration that produce 10 mW/cm$^2$ of infrared (IR) light at the item 110.

The difference between a stimulation wavelength of the stimulation photon 144 and the emission wavelength of the emission photon 146 may be at least 30 nm. For example, the stimulation wavelength may be approximately 808 nm while the emission wavelength is approximately 850 nm.

A filter 148 is included in an optical path of a camera 150. The filter 148 is configured to allow for the transmittance of the emission photons 146, but may attenuate or block photons at other wavelengths, including the stimulation photons 144. For example, the filter 148 may be configured to transmit photons with a wavelength of between 840 and 860 nm, while attenuating or blocking others. In one implementation the filter 148 may comprise an OD4 filter centered on 850 nm that transmits photons with a wavelength of between 837.5 to 862.5 nm. In some implementations the filter 148 may be omitted. For example, the camera 150 may comprise a narrowband detector that is sensitive to the emission photons 146 and not the stimulation photons 144 or other photons such as visible light.

The camera 150 may comprise one or more of a photomultiplier device, charge coupled device, complementary metal oxide semiconductor, microbolometer, and so forth. The camera 150 may be configured to generate image data 152. For example, the image data 152 may comprise a bitmap. In this illustration, the image data 152 is representative of an IR fluorescent image 154. In this IR fluorescent image 154 the marks 138 are apparent and detectable. The background, such as the preprinted visible mark 114 and the surface of the item 110, appear black in this IR fluorescent image 154 because they do not produce emission photons 146, or produce a quantity of emission photons 146 that are below a threshold value. For example, some fluorescence responsive to the stimulation photon 144 may occur in the ink of the preprinted visible mark 114 or the surface of the item 110.

As depicted in the IR fluorescent image 154, the number of emission photons 146 may be affected by the material underneath the mark 138. For example, the ink used to produce the preprinted visible mark 114 may be highly absorptive of IR light such as the stimulation photons 144 and the emission photons 146. As a result, the number of emission photons 146 returned from ink 126 above the preprinted visible mark 114 may be reduced. As described elsewhere, the reflective material 134 may increase the number of emission photons 146, thus improving the detectability of the marks 138.

Because of the use of one or more filters 148 or the camera 150 having a detector that is responsive to the emission photon 146 and not the stimulation photon 144, features other than the marks 138 are suppressed. In some implementations, spurious signals may be suppressed or eliminated by controlling the ambient illumination of the item 110 during detection. For example, the ambient lighting systems may utilize fluorescent elements, electroluminescent elements, or light emitting diode elements to produce ambient light that produces light at the wavelength of the emission photon 146 that is below a threshold level of intensity. For example, where the emission photon 146 has a wavelength of 850 nm, the shelf lighting at an inventory location and overhead lighting may be designed or filtered to remove light at 850 nm. By reducing or eliminating sources of light in the wavelength of the emission photons 146 of interest, the background may be suppressed, significantly reducing the computational complexity in locating and extracting the marking from the image data 152.

The light source 142 and the camera 150 may operate at some distance from the item 110. For example, the light source 142 and the camera 150 may be between 2 and 4 meters away from the item 110. In one implementation the light source 142 and the camera 150 may be mounted overhead within the facility, such that during placement to, or removal from, an inventory location such as a shelf, the image data 152 of the marks 138 may be generated. The light source 142 and the camera 150 may be located adjacent to one another, or may be separate. For example, the light source 142 may be at a first location, such as built into an underside of a shelf, while the camera 150 is positioned overhead. In other implementations, one or more of the light source 142 or the camera 150 may be closer, such as less than 1 meter from the item 110 during use.

The image data 152 is then provided to a computing device 156. For example, the camera 150 may acquire images at 30 frames per second (fps) and send this image data 152 over a local area network to the computing device 156. In other implementations the computing device 156 may be incorporated into the camera 150.

The computing device 156 uses an image processing module 158 to process the image data 152 and generate output data 160. The image processing module 158 may utilize one or more techniques to determine the presence of one or more elements of the marks 138. For example, the mark 138 may comprise a two-dimensional (2D) arrangement of features such as circles, squares, or an absence of either. The image processing module 158 may apply various filters, such as pre-filtering with histogram equalization. Blob detection may be used to determine features in the image data 152, such as the marks 138. Cluster detection may be used to find groups of blobs that are clustered together. Clusters may then be processed to determine if a grid arrangement of blobs is present, and if that grid matched a predetermined grid arrangement, such as a 4×6 arrangement. Once the grid has been determined, the marks 138 within the grid may be determined and the grid decoded to produce the output data 160.

The image processing module 158 may utilize other techniques as well. For example, perspective unwarping may be implemented to modify the image data 152 so that it appears unaffected by perspective effects. In another example, three-dimensional (3D) location detection techniques may be used to determine the position of at least a portion of the marks 138 in space. The 3D location may be determined based on known physical size of the marks 138, characteristics of the camera 150, apparent size of the marks 138 in the image data 152, and so forth. The image processing module 158 may implement one or more of a linear classifier, histogram of gradients (HOG) detector, artificial neural network, and so forth.

Because the camera 150 is generating image data 152 representative of the particular wavelength of the emission photon 146, or a relatively narrow range that includes this wavelength, little or no background suppression may be needed. For example, other objects in the field of view of the camera 150 such as conveyor belts, shelf surfaces, other portions of the items 110 packaging, and so forth will not produce an appreciable response in the image data 152. These other objects would appear black, while the marks 138 are discernable. As a result, techniques such as edge detection, distance determination, and so forth, to try and determine what is background is unnecessary or may be greatly simplified, reducing the amount of computer resources needed to process the image data 152.

The output data 160 may include information such as the input data 116, the encoded data 120, orientation data, directional data indicative of motion of the item 110, physical location of the mark 138 with respect to the facility or a portion thereof, a confidence value, and so forth. For example, the output data 160 may include the SKU as encoded by the mark 138 and a confidence value as to how reliable the readout of the SKU is determined to be. The orientation data may be indicative of the orientation of the mark 138. Given a known placement of the mark 138 on the item 110, the orientation of the item 110 with respect to the camera 150 may be determined. The directional data may comprise information indicative of the motion of the item 110, such as removal from an inventory location or placement into the inventory location. The physical location of the item 110 may include determining where in three-dimensional (3D) space the item 110 is located. For example, given a known size of the marks 138, orientation data from how the marks 138 have been printed, and a known position of the camera 150, the position of the item 110 in space may be determined. In other implementations, the output data 160 may include other information.

The output data 160 may be provided to an inventory management system, or other systems, for subsequent use. For example, the output data 160 may be used to change a quantity on hand at a particular inventory location, associate a quantity of a type of item 110 with a particular user, and so forth.

While the system is described as operating in infrared wavelength, it is understood that in some implementations other wavelengths may be used. For example, the fluorescent dye 130 may fluoresce when the stimulation photon 144 is within ultraviolet (UV) wavelengths and produce a UV emission photon 146.

The marking system 102 and the detection system 104 may be located at the same facility, or may be installed and operated at different facilities. In some implementations, the marking system 102 and the detection system 104 may be operated by different entities. For example, a manufacturer of the items 110 may utilize the marking system 102 while a merchant may operate the detection system 104.

Figure 2:
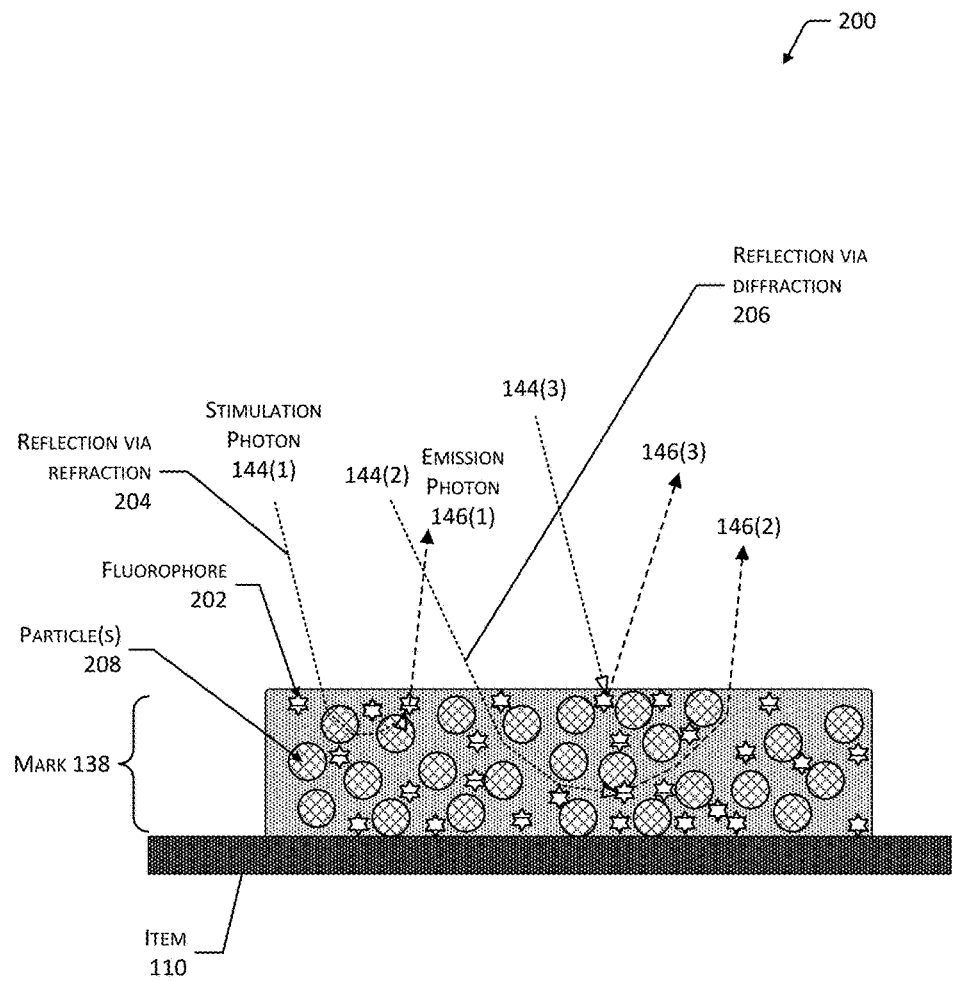
FIG. 2 illustrates a cross sectional view of a mark that comprises a fluorescent dye and a reflective material during interaction with light, according to some implementations.

FIG. 2 illustrates a cross sectional view 200 of a mark 138 that comprises the fluorescent dye 130 and the reflective material 134 during interaction with light, according to some implementations. For ease of illustration and comprehension, this figure and the following figures are not drawn to scale.

The mark 138 includes the components of the fluorescent dye 130, such as fluorophores 202. The fluorophores 202 comprise molecules or other structures that, when stimulated with a stimulation photon 144 at a first wavelength will fluoresce and release an emission photon 146 at a second wavelength.

The mark 138 as produced by the printer 108 may include the reflective material 134. The reflective material 134 may produce reflection in one or more modes including a reflection via refraction 204 or a reflection via diffraction 206. The reflective material 134 may comprise particles 208. In one implementation, the particles 208 may have an average size that is within a desired range, such as between 405 nm and 425 nm. In other implementations, the particles 208 may have a lower size limit or an upper size limit. For example, the particles 208 may be of various sizes less than 425 nm.

Reflection may occur as a result of refraction, such as when light transitions from a first material with a first index of refraction to a second material with a different index of refraction. At 204 the path of a light ray is depicted which undergoes reflection via refraction. In this example a stimulation photon 144(1), as it is refracted by multiple particles 208, illustrates reflection via refraction. The stimulation photon 144(1) ultimately is shown interacting with a fluorophore 202 to produce an emission photon 146(1) via fluorescence, which is then emitted. Other photons, such as the emission photons 146 may also be reflected via refraction.

Reflection via diffraction 206 occurs as a result of diffraction, in which the photon interacts with an adjacent object, such as the particles 208. For example, stimulation photon 144(2) is shown being diffracted during passage past several particles 208. The stimulation photon 144(2) itself may then be subsequently diffracted, as shown here.

The size of the particles 208 may be adjusted to improve operation at one or more of the wavelengths of the stimulation photons 144 or emission photons 146. For example, the particles 208 may be sized to provide reflection via refraction 204 at the wavelengths of the emission photons 146. Continuing the example, if the emission photons 146 have a wavelength of about 850 nm, the particles 208 may have an average size of 425 nm.

By including the particles 208 of the reflective material 134, the mark 138 produces emission photons 146 that may be detected reliably at some distance using the camera 150. Without the reflective material 134, the incident stimulation photons 144 may pass through the mark 138 to be absorbed by the surface of the item 110. With the addition of the reflective material 134, the likelihood of the stimulation photon 144 encountering a fluorophore 202 may be increased. As a result, the reflective material 134 mitigates the absorption of the stimulation photon 144 by the item 110.

Likewise, the reflective material 134 in the ink 126 may also improve the return of the emission photons 146 toward the camera 150. For example, an emission photon 146 may be directed away from the item 110 and towards the camera 150.

Figure 3:
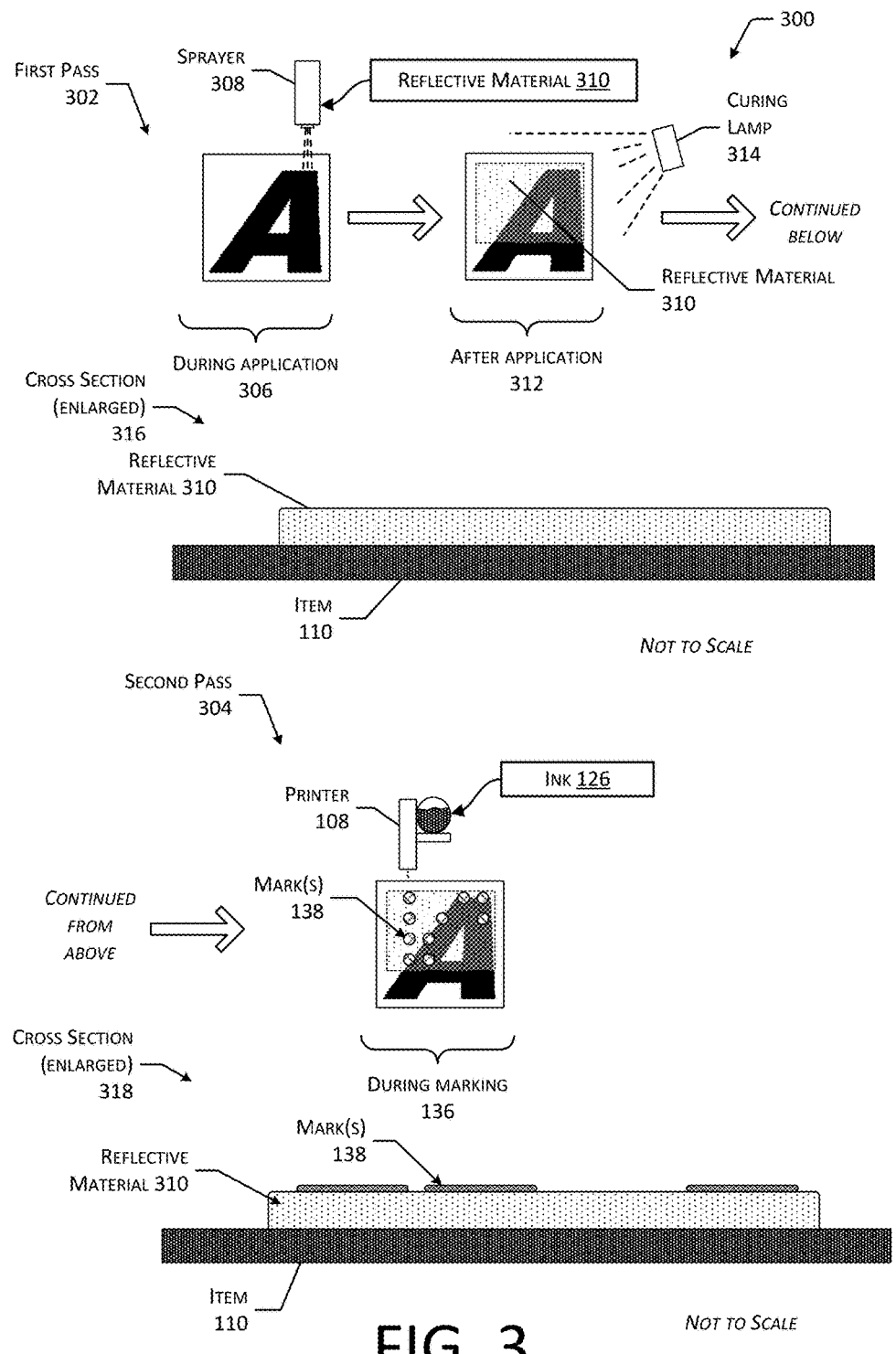
FIG. 3 illustrates a two-pass implementation in which a reflective material is deposited and the mark applied above, according to some implementations.

FIG. 3 illustrates a two-pass implementation 300 in which a reflective material 310 is deposited and the mark 138 is then applied on this reflective material 310, according to some implementations. The readability of the marks 138 as detected by the camera 150 may be improved in some implementations by utilizing a reflective material 310.

In this implementation, the printing of the marks 138 may involve two passes. A first pass 302 that applies a reflective material 310 and a second pass 304 that deposits the ink 126 on the reflective material 310 to produce the marks 138.

During the first pass 302 and during application 306, a sprayer 308 or other mechanism applies a reflective material 310 to at least a portion of a surface of the item 110. The reflective material 310 is reflective to IR light, such as IR light at the wavelengths of the stimulation photons 144 and the emission photons 146. The reflective material 310 may comprise the particles 208 as shown above. As described above with regard to FIG. 2, the particles 208 may produce reflection via several modes including refraction 204 and diffraction 206. The reflective material 310 may comprise rutile titanium dioxide. In other implementations, other forms of titanium dioxide, metals, and so forth may be used. The thickness of the reflective material 310 as placed on the surface of the item 110 may be between 10 microns and 1000 microns.

The sprayer 308 may emit from a nozzle a spray of the reflective material 310. In other implementations other devices may be utilized to apply the reflective material 310. For example, a roller comprising a roller frame that supports a roller cover may be used. The roller cover rotates with respect to the roller frame, and absorbs at least a portion of the reflective material 310. Upon contact with the item 110, at least a portion of the reflective material 310 is transferred to the surface of the item 110.

The reflective material 310 may be applied to a particular portion of the item 110. For example, the reflective material 310 may be applied in a rectangular patch that is 2 inches by 3 inches.

The reflective material 310 is configured to be reflective for at least some IR wavelengths, while being invisible or minimally visible in visible light to the unaided human eye. In one implementation, the reflective material 310 may comprise particles 208 encapsulated within a polymer, resin, or other material. For example, the polymer may comprise polyurethane. In another example, the particles 208 may be encapsulated in a resin. When encapsulated, the majority of the particles 208 in the reflective material 310 are surrounded by the polymer or resin. The particles 208 may be encapsulated individually or in bulk.

In some implementations the reflective material 310 requires additional processing to cure. As shown here, after application 312 the polymer may need additional processing. For example, the polymer may comprise a photocuring resin epoxy that, when exposed to ultraviolet (UV) light, cures and hardens. A curing lamp 314 is depicted that provides this UV light to cure the reflective material 310. In other implementations, other techniques may be used to prepare the reflective material 310 for printing of the mark 138. For example, the reflective material 310 may be air dried following the application.

At 316 an enlarged cross section is depicted, showing the reflective material 310 atop the surface of the item 110.

Once the reflective material 310 is ready, the process proceeds to the second pass 304. During the second pass, similar to that described above with regard to FIG. 1, the printer 108 applies the ink 126 atop the reflective material 310 to produce one or more marks 138. At 318 an enlarged cross section shows the marks 138 atop the reflective material 310.

The first pass 302 and the second pass 304 may be integrated into a continuous process. For example, the sprayer 308 and curing lamp 314 may be located upstream of the printer 108 on a conveyer belt, such that the reflective material 310 is applied, cured, and the mark 138 then being applied to the reflective material 310.

In one implementation, after deposition, the reflective material 310 may exhibit a transmittance of greater than 80% to visible light and a reflectance of greater than 80% to infrared light with a wavelength of between 800 and 870 nanometers.

Figure 4:
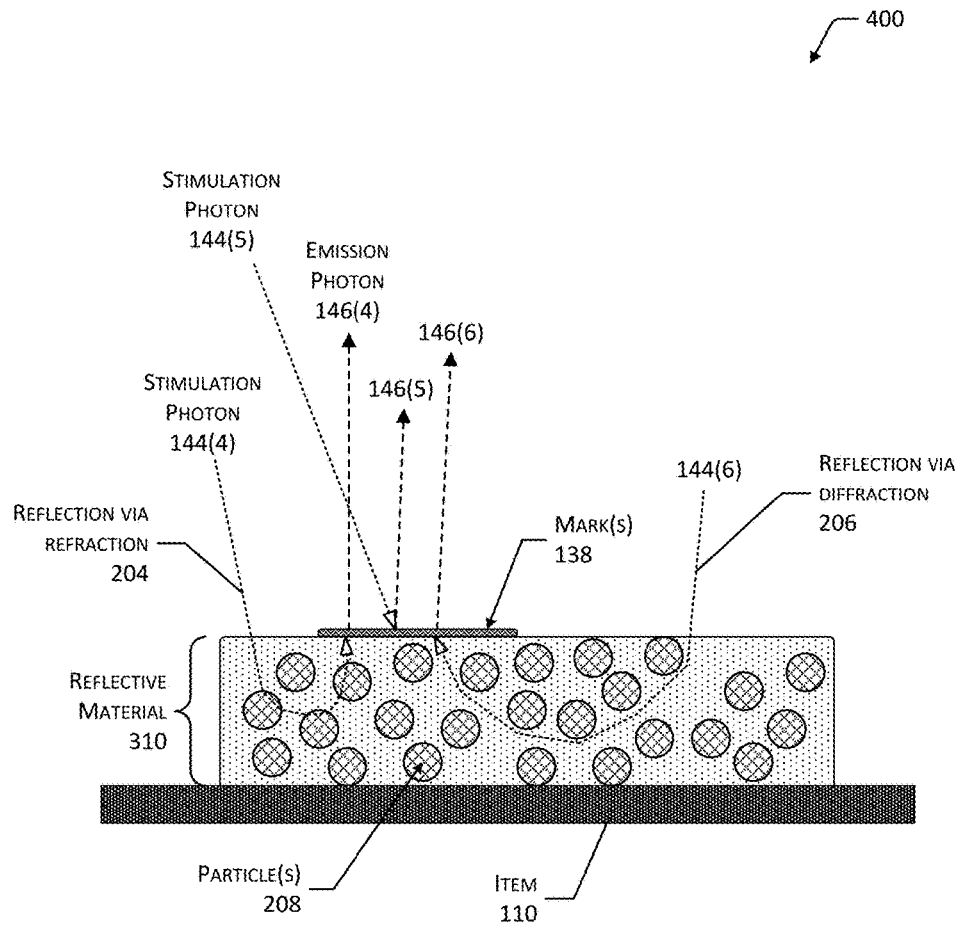
FIG. 4 illustrates a cross sectional view of a mark atop the reflective material during interaction with light, according to some implementations.

FIG. 4 illustrates a cross sectional view 400 of a mark 138 atop the reflective material 310 during interaction with light, according to some implementations. As described above with regard to FIG. 2, the particles 208 may produce reflection via several modes including refraction 204 and diffraction 206.

As shown in this illustration, the relatively large thickness of the reflective material 310 with respect to the thickness of the mark 138 provides more volume for the particles 208 to interact with photons. In some implementations the particles 208 may form a particular structure, such as sheets, nanoscopic or microscopic structures in three-dimensions. The reflective material 310 provides a reflective foundation that increases the number of stimulation photons 144 that reach the marks 138, while also redirecting some of the emission photons 146 toward the camera 150. As a result, the use of the reflective material 310 may improve the readability of the mark 138 by the detection system 104. For example, the reflective material 310 mitigates the variability of the underlying surface of the item 110. For example, the reflective material 310 provides for improved return of an emission photon 146 for a mark 138 having ink 126 that would otherwise be atop the preprinted visible mark 114 and that may be highly absorptive in infrared.

After the reflective material 310 has been deposited and is ready for printing (such as after drying or curing), the reflective material 310 may exhibit a transmittance of greater than 80% to visible light and a reflectance of greater than 80% to infrared light with a wavelength of between 800 and 870 nanometers. This renders the reflective material 310 invisible or minimally visible under visible light.

In other implementations, instead of or in addition to the reflective material 310, the other material 135 may be applied to the item 110 prior to application of the marks 138. For example, a layer of one or more of a resin, polyurethane, or polymer may be applied.

Figure 5:
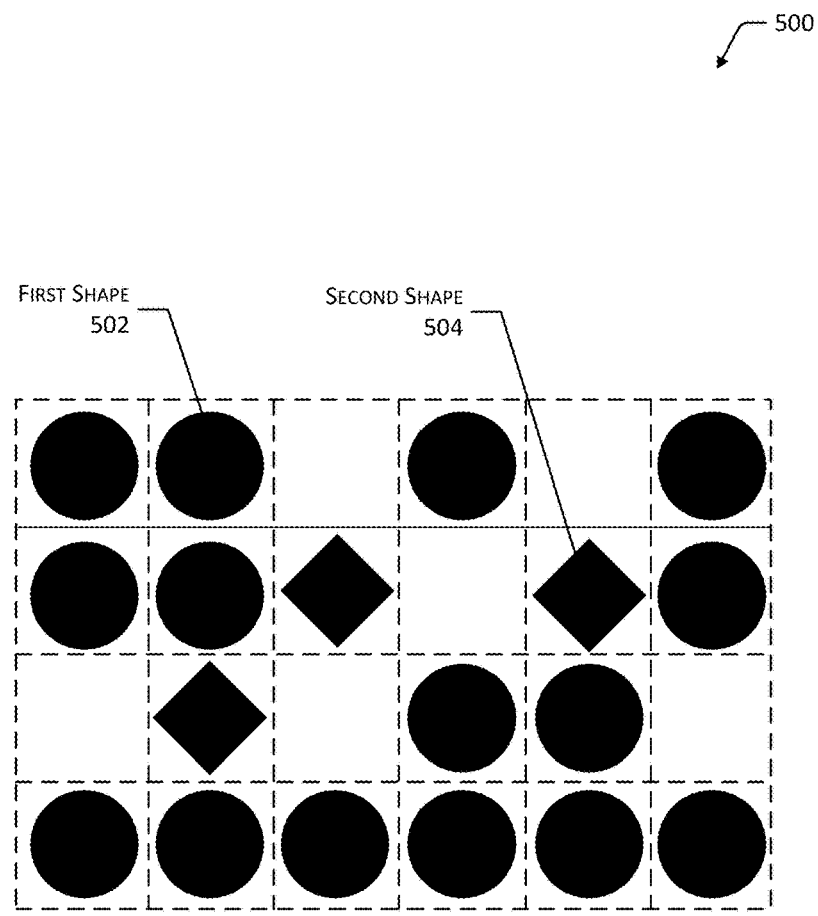
FIG. 5 illustrates an example mark, according to some implementations.

FIG. 5 illustrates an example mark 138, according to some implementations. For example, the mark 138 may comprise a grid of four rows and six columns. Within each cell of the grid may be a first shape 502, a second shape 504, or a blank (null). For example, the first shape 502 may comprise a circle while the second shape 504 may comprise a square. In other implementations, other shapes may be used. For example, the first shape 502 may comprise a circle while the second shape 504 comprises a triangle. In still other implementations, additional shapes may be utilized. For example, circles, squares, triangles, and nulls may be used within a cell.

At least a portion of the mark 138 may be configured to provide particular information. For example, certain cells may always contain particular values, such as the first shape 502, to provide information indicative of the orientation of the mark 138.

In other implementations, other machine-readable patterns may be used. For example, the grid may comprise different numbers of rows or columns. In another example, the marks 138 may comprise a linear or one-dimensional barcode.

Other techniques may also be used to encode data. In another implementation, the ink 126 absorbs the infrared light from the light source 142. The marks 138 with this absorptive ink may be printed on a material that is reflective to the infrared light from the light source 142. For example, the IR absorptive marks 138 may be printed on a label that is IR reflective, such that the resulting image data 152 would appear to be light colored while the marks 138 appears darker.

Figure 6:
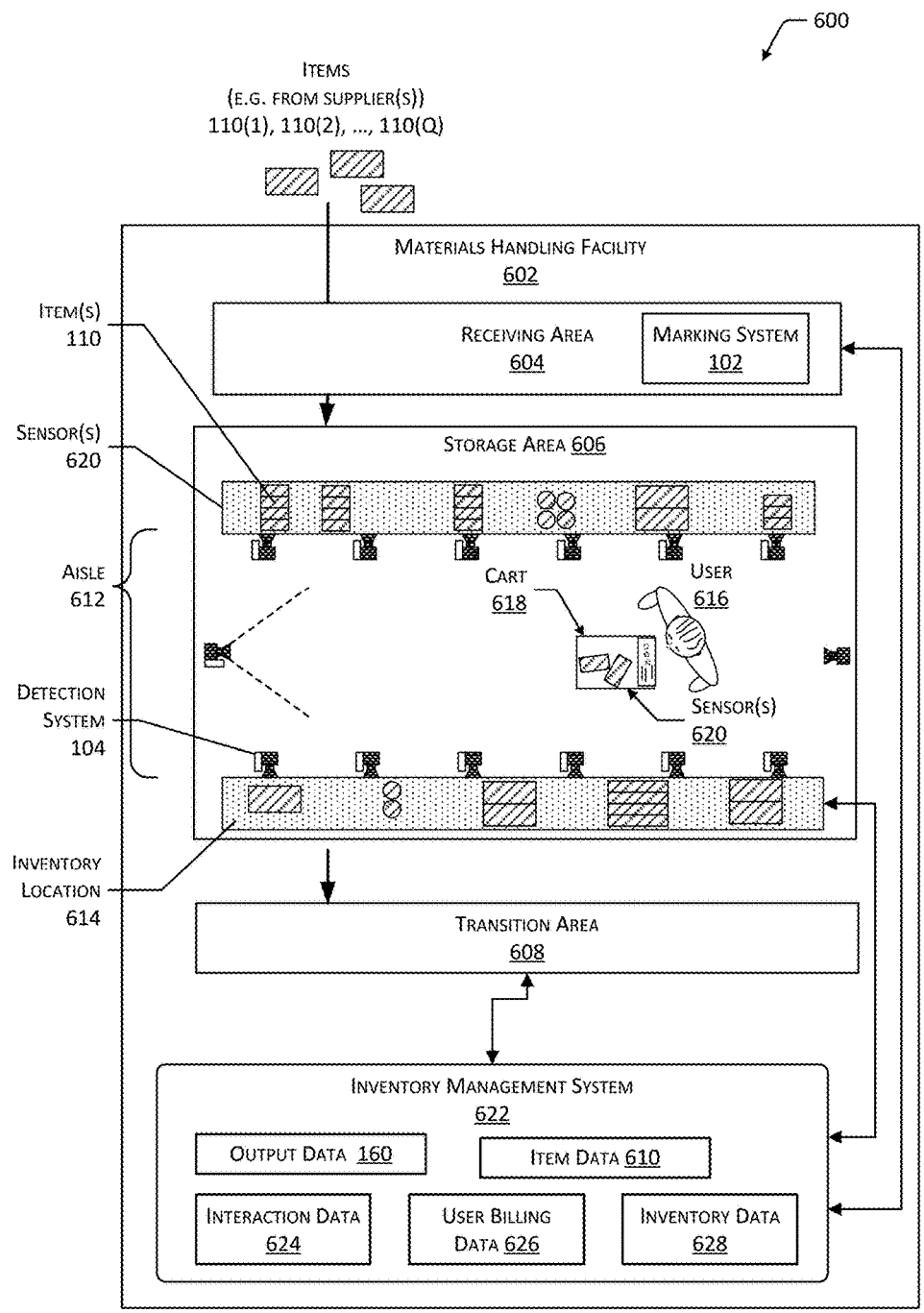
FIG. 6 is a block diagram illustrating a materials handling facility (facility) using the system, according to some implementations.

FIG. 6 is a block diagram 600 illustrating a materials handling facility (facility) 602 using the system 100, according to some implementations. A facility 602 comprises one or more physical structures or areas within which one or more items 110(1), 110(2), . . . , 110(Q) may be held. As used in this disclosure, letters in parenthesis such as "(Q)" indicate an integer value greater than or equal to zero. The items 110 may comprise physical goods, such as books, pharmaceuticals, repair parts, electronic gear, and so forth.

The facility 602 may include one or more areas designated for different functions with regard to inventory handling. In this illustration, the facility 602 includes a receiving area 604, a storage area 606, and a transition area 608.

The facility 602 may be configured to receive different kinds of items 110 from various suppliers and to store them until a customer orders or retrieves one or more of the items 110. A general flow of items 110 through the facility 602 is indicated by the arrows of FIG. 6. Specifically, as illustrated in this example, items 110 may be received from one or more suppliers, such as manufacturers, distributors, wholesalers, and so forth, at the receiving area 604. In various implementations, the items 110 may include merchandise, commodities, perishables, or any suitable type of item 110, depending on the nature of the enterprise that operates the facility 602. Upon being received from a supplier at the receiving area 604, the items 110 may be prepared for storage in the storage area 606. For example, in some implementations, items 110 may be unpacked or otherwise rearranged. The receiving area 604 may be configured to accept items 110, such as from suppliers, for intake into the facility 602. For example, the receiving area 604 may include a loading dock at which trucks or other freight conveyances unload the items 110. After arriving through the receiving area 604, items 110 may be stored within the storage area 606. In some implementations, like items 110 may be stored or displayed together in the inventory locations 614 such as in bins, on shelves, hanging from pegboards, and so forth. In this implementation, all items 110 of a given kind are stored in one inventory location 614. In other implementations, like items 110 may be stored in different inventory locations 614. For example, to optimize retrieval of certain items 110 having frequent turnover within a large physical facility 602, those items 110 may be stored in several different inventory locations 614 to reduce congestion that might occur at a single inventory location 614.

In some implementations, the items 110 may be processed, such as at the receiving area 604, to generate at least a portion of the item data 610. For example, an item 110 may be weighed, imaged or otherwise scanned to develop reference images or representations of the item 110 at the receiving area 604. In some implementations, the marks 138 on the item 110 may be read to identify the type of item during the receiving process.

The item data 610 provides information about the characteristics of a particular type of item 110. These characteristics may include weight of the item 110 individually or in aggregate. For example, the item data 610 may comprise information indicative of a weight of a single item 110, or a package, kit, or other grouping considered to be a single item 110. Other information such as weight distribution may also be stored.

The item data 610 may include data about other characteristics, such as information about appearance for use in machine vision or manual recognition. For example, the item data 610 may include sample images of the type of item 110, three-dimensional point cloud data for the item 110, and so forth. The sample image data may comprise one or more images of one or more of that type of item 110. For example, sample image data may be obtained during processing or intake of the item 110 to be used by the facility.

The item data 610 may include other information about the appearance. For example, a plurality of local descriptor values may be generated by feature extraction algorithms, parameters for classifiers, neural network configuration data, and so forth, that characterizes the appearance of a representative of one or more of the item 110.

The item data 610 may include one or more geometry data. The geometry data may include information indicative of size and shape of the item 110 in one, two, or three dimensions. For example, the geometry data may include the overall shape of an item 110, such as a cuboid, sphere, cylinder, and so forth. The geometry data may also include information such as length, width, depth, and so forth, of the item 110. Dimensional information in the geometry data may be measured in pixels, centimeters, inches, arbitrary units, and so forth. The geometry data may be for a single item 110, or a package, kit, or other grouping considered to be a single item 110.

The item data 610 may include an item identifier. The item identifier may be used to distinguish one type of item 110 from another. For example, the item identifier may include a stock keeping unit (SKU) string, Universal Product Code (UPC) number, and so forth. The items 110 that are of the same type may be referred to by the same item identifier. For example, cans of beef flavor Brand X dog food may be represented by the item identifier value of "9811901181". In other implementations, non-fungible items 110 may each be provided with a unique item identifier, allowing each to be distinguished from one another. In some implementations, the data encoded by the mark 138 may comprise the item identifier.

The item data 610 may indicate the types and quantities of items 110 that are expected to be stored at that particular inventory location such as in a particular lane on a shelf. The item data 610 may include one or more inventory location identifiers (IDs). The inventory location ID is indicative of a particular area or volume of an inventory location such as a shelf that is designated for stowage of the type of item 110. For example, a single shelf may have several lanes, each with a different inventory location ID. Each of the different inventory location IDs may be associated with a lane having a particular area on the shelf designated for storage of a particular type of item 110. A single type of item 110 may be associated with a particular inventory location ID, a plurality of inventory location IDs may be associated with the single type of item 110, more than one type of item 110 may be associated with the particular inventory location ID, and so forth.

In one implementation, the items 110 may have the marks 138 applied in the receiving area 604. In another implementation, the marking system 102 may be utilized at the manufacturer of the item 110, at a transshipment point, and so forth, and the items 110 may arrive with the marks 138 already applied.

The storage area 606 is configured to store the items 110. The storage area 606 may be arranged in various physical configurations. In one implementation, the storage area 606 may include one or more aisles 612. The aisle 612 may be configured with, or defined by, inventory locations 614 on one or both sides of the aisle 612. The inventory locations 614 may include one or more of a shelf, a rack, a case, a cabinet, a bin, a floor location, or other suitable storage mechanisms for holding, supporting, or storing the items 110. For example, the inventory locations 614 may comprise shelves with lanes designated therein. The inventory locations 614 may be affixed to the floor or another portion of the structure of the facility 602. The inventory locations 614 may also be movable such that the arrangement of aisles 612 may be reconfigurable. In some implementations, the inventory locations 614 may be configured to move independently of an outside operator. For example, the inventory locations 614 may comprise a rack with a power source and a motor, operable by a computing device to allow the rack to move from one location within the facility 602 to another.

One or more users 616(1), 616(2), ..., 616(U) and carts 618(1),618(2), ..., 618(T) or other material handling apparatus may move within the facility 602. For example, the user 616 may move about within the facility 602 to pick or place the items 110 in various inventory locations 614, placing them on the cart 618 for ease of transport. The cart 618 is configured to carry or otherwise transport one or more items 110. For example, the cart 618 may include a basket, cart, bag, bin, and so forth. In some implementations, the cart 618 may include a detection system 104. For example, as items 110 are placed into or removed from the cart 618, the detection system 104 may be used to read the marks 138 and generate output data 160. The output data 160 may then be used to determine the items 110 that are in the cart 618.

Other material handling apparatuses such as robots, forklifts, cranes, aerial drones, and so forth, may move about the facility 602 picking, placing, or otherwise moving the items 110. For example, a robot may pick an item 110 from a first inventory location 614(1) and move the item 110 to a second inventory location 614(2).

One or more sensors 620 may be configured to acquire information in the facility 602. The sensors 620 may include the detection system 104 described above. Other sensors 620, such as cameras 620(1), weight sensors 620(15), and so forth may also be used. The sensors 620 may be stationary or mobile, relative to the facility 602. For example, the inventory locations 614 may contain weight sensors 620(15) to acquire weight sensor data of items 110 stowed therein and detection systems 104 to acquire images of picking or placement of items 110 on shelves, and so forth. In another example, the facility 602 may include cameras 620(1) to obtain images of the user 616 or other objects in the facility 602. The sensors 620 are discussed in more detail below with regard to FIG. 7.

While the storage area 606 is depicted as having one or more aisles 612, inventory locations 614 storing the items 110, sensors 620, and so forth, it is understood that the receiving area 604, the transition area 608, or other areas of the facility 602 may be similarly equipped. Furthermore, the arrangement of the various areas within the facility 602 is depicted functionally rather than schematically. For example, in some implementations, multiple different receiving areas 604, storage areas 606, and transition areas 608 may be interspersed rather than segregated in the facility 602.

The facility 602 may include, or be coupled to, an inventory management system 622. The inventory management system 622 is configured to interact with users 616 or devices such as sensors 620, robots, material handling equipment, computing devices, and so forth, in one or more of the receiving area 604, the storage area 606, or the transition area 608.

During operation of the facility 602, the sensors 620 may be configured to provide sensor data, or information based on the sensor data, to the inventory management system 622. The sensor data may include output data 160, image data, non-image data such as weight sensor data obtained from weight sensors 620(15), and so forth.

The inventory management system 622 or other systems may use the sensor data to track the location of objects within the facility 602, movement of the objects, or provide other functionality. Objects may include, but are not limited to, items 110, users 616, carts 618, and so forth. For example, a series of images acquired by the camera 620(1) may indicate removal by the user 616 of an item 110 from a particular location on the inventory location 614 and placement of the item 110 on or at least partially within the cart 618. The item 110 may be identified by using the detection system 104 to produce output data 160 indicative of the marks 138 on the item 110. The resulting output data 160 may be used to determine the type of item 110 that was picked or placed at the inventory location 614.

The inventory management system 622 may include one or more software applications executing on a computer system to provide inventory management functions. These inventory management functions may include maintaining information indicative of the type, quantity, condition, cost, location, weight, or any other suitable parameters with respect to the items 110. The items 110 may be stocked, managed, or dispensed in terms of countable units, individual units, or multiple units, such as packages, cartons, crates, pallets, or other suitable aggregations. Alternatively, some items 110, such as bulk products, commodities, and so forth, may be stored in continuous or arbitrarily divisible amounts that may not be inherently organized into countable units. Such items 110 may be managed in terms of a measurable quantity such as units of length, area, volume, weight, time, duration, or other dimensional properties characterized by units of measurement. Generally speaking, a quantity of an item 110 may refer to either a countable number of individual or aggregate units of an item 110 or a measurable amount of an item 110, as appropriate.

When a customer order specifying one or more items 110 is received, or as a user 616 progresses through the facility 602, the corresponding items 110 may be selected or "picked" from the inventory locations 614 containing those items 110. In various implementations, item picking may range from manual to completely automated picking. For example, in one implementation, a user 616 may have a list of items 110 they desire and may progress through the facility 602 picking items 110 from inventory locations 614 within the storage area 606 and placing those items 110 into a cart 618. In other implementations, employees of the facility 602 may pick items 110 using written or electronic pick lists derived from customer orders. These picked items 110 may be placed into the cart 618 as the employee progresses through the facility 602.

After items 110 have been picked, the items 110 may be processed at a transition area 608. The transition area 608 may be any designated area within the facility 602 where items 110 are transitioned from one location to another or from one entity to another. For example, the transition area 608 may be a packing station within the facility 602. When the item 110 arrives at the transition area 608, the items 110 may be transitioned from the storage area 606 to the packing station. Information about the transition may be maintained by the inventory management system 622.

In another example, if the items 110 are departing the facility 602, a list of the items 110 may be obtained and used by the inventory management system 622 to transition responsibility for, or custody of, the items 110 from the facility 602 to another entity. For example, a carrier may accept the items 110 for transport with that carrier accepting responsibility for the items 110 indicated in the list. In another example, a user 616 may purchase or rent the items 110 and remove the items 110 from the facility 602. During use of the facility 602, the user 616 may move about the facility 602 to perform various tasks, such as picking or placing the items 110 in the inventory locations 614.

To facilitate operation of the facility 602, the inventory management system 622 is configured to use the sensor data including the output data 160, weight sensor data, image data and other information such as the item data 610, the physical layout data, and so forth, to generate interaction data 624. For example, the confidence level associated with a determination that the user 616 has a particular item 110 in their cart 618 may be based on the confidence level in the output data 160 produced by the detection system 104.

The interaction data 624 may provide information about an interaction, such as a pick of an item 110 from the inventory location 614, a place of an item 110 to the inventory location 614, a touch made to an item 110 at the inventory location 614, a gesture associated with an item 110 at the inventory location 614, and so forth. The interaction data 624 may include one or more of the type of interaction, interaction location identifier indicative of where from the inventory location 614 the interaction took place, item identifier, quantity change to the item 110, user identifier, and so forth. The interaction data 624 may then be used to further update the inventory data 628. For example, the quantity of items 110 on hand at a particular lane on the shelf may be changed based on an interaction that picks or places one or more items 110.

The inventory management system 622 may combine or otherwise utilize data from different sensors 620 of different types. For example, output data 160 obtained by the detection system 104 may be used in conjunction with weight data obtained from weight sensors 620(15) at the inventory location 614 to determine the interaction data 624.

The inventory management system 622 may generate other data. In one implementation, user billing data 626 may be generated that comprises a bill or invoice for the items 110 that have been taken into the custody of the user 616. For example, as the user 616 leaves the facility with their cart 618, a list and cost associated with the purchase for those items 110 may be determined, taxes or other fees assessed, and that information included in the user billing data 626.

The inventory management system 622 may also maintain inventory data 628. For example, the inventory data 628 may comprise information such as quantity on hand at a particular inventory location, determine when to order additional items 110 for restock, and so forth.

In some implementations, the inventory management system 622 may use the output data 160 to direct the movement of items 110 within the facility 602. For example, the user 616 may be wearing an augmented reality headset that presents audible or visual information to the user 616. The detection system 104 may read the marks 138 on the item 110 and generate output data 160 that identifies that item 110. The inventory management system 622 may use that output data 160 to determine that the item 110 is to be stowed in a particular inventory location 614. The inventory management system 622 may generate instructions to present prompts to the user 616 by way of the augmented reality headset, directing the user 616 to place the item 110 in the particular inventory location 614.

Figure 7:
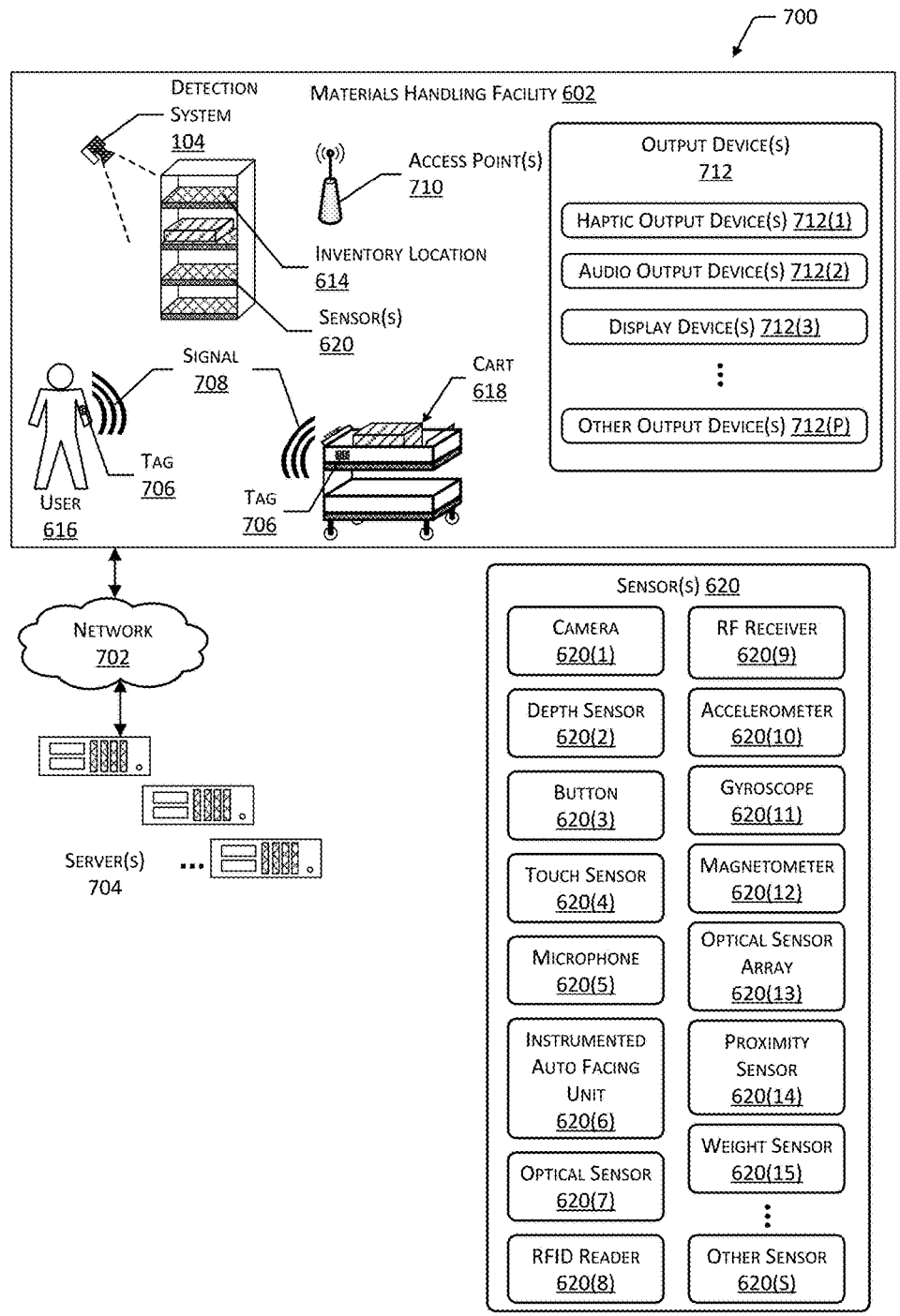
FIG. 7 is a block diagram illustrating additional details of the facility, according to some implementations.

FIG. 7 is a block diagram 700 illustrating additional details of the facility 602, according to some implementations. The facility 602 may be connected to one or more networks 702, which in turn connect to one or more servers 704. The network 702 may include private networks such as an institutional or personal intranet, public networks such as the Internet, or a combination thereof. The network 702 may utilize wired technologies (e.g., wires, fiber optic cables, and so forth), wireless technologies (e.g., radio frequency, infrared, acoustic, optical, and so forth), or other connection technologies. The network 702 is representative of any type of communication network, including one or more of data networks or voice networks. The network 702 may be implemented using wired infrastructure (e.g., copper cable, fiber optic cable, and so forth), a wireless infrastructure (e.g., cellular, microwave, satellite, and so forth), or other connection technologies.

The servers 704 may be configured to execute one or more modules or software applications associated with the inventory management system 622 or other systems. While the servers 704 are illustrated as being in a location outside of the facility 602, in other implementations, at least a portion of the servers 704 may be located at the facility 602. The servers 704 are discussed in more detail below with regard to FIG. 8.

The users 616, the carts 618, or other objects in the facility 602 may be equipped with one or more tags 706. The tags 706 may be configured to emit a signal 708. In one implementation, the tag 706 may be a radio frequency identification (RFID) tag 706 configured to emit a RF signal 708 upon activation by an external signal. For example, the external signal may comprise a radio frequency signal or a magnetic field configured to energize or activate the RFID tag 706. In another implementation, the tag 706 may comprise a transmitter and a power source configured to power the transmitter. For example, the tag 706 may comprise a Bluetooth Low Energy (BLE) transmitter and battery. In other implementations, the tag 706 may use other techniques to indicate presence of the tag 706. For example, an acoustic tag 706 may be configured to generate an ultrasonic signal 708, which is detected by corresponding acoustic receivers. In yet another implementation, the tag 706 may be configured to emit an optical signal 708.

The inventory management system 622 may be configured to use the tags 706 for one or more of identification of the object, determining a location of the object, and so forth. For example, the users 616 may wear tags 706, the carts 618 may have tags 706 affixed, and so forth, which may be read and, based at least in part on signal strength, used to determine identity and location.

Generally, the inventory management system 622 or other systems associated with the facility 602 may include any number and combination of input components, output components, and servers 704.

The sensors 620 may include the detection system 104 described above. During operation, the detection system 104 may produce output data 160 that is used by the inventory management system 622. The one or more sensors 620 may be arranged at one or more locations within the facility 602. For example, the sensors 620 may be mounted on or within a floor, wall, at a ceiling, at an inventory location 614, on a cart 618, may be carried or worn by a user 616, and so forth.

The sensors 620 may include one or more cameras 620(1) or other imaging sensors. The one or more cameras 620(1) may include imaging sensors configured to acquire images of a scene. The cameras 620(1) are configured to detect light in one or more wavelengths including, but not limited to, terahertz, infrared, visible, ultraviolet, and so forth. The cameras 620(1) may comprise charge coupled devices (CCD), complementary metal oxide semiconductor (CMOS) devices, microbolometers, and so forth. The inventory management system 622 may use image data acquired by the cameras 620(1) during operation of the system 100 in the facility 602. For example, the inventory management system 622 may identify items 110, users 616, carts 618, and so forth, based at least in part on their appearance within the image data acquired by the cameras 620(1). The cameras 620(1) may be mounted in various locations within the facility 602. For example, cameras 620(1) may be mounted overhead, on inventory locations 614, may be worn or carried by users 616, may be affixed to carts 618, and so forth.

One or more depth sensors 620(2) may also be included in the sensors 620. The depth sensors 620(2) are configured to acquire spatial or three-dimensional (3D) data, such as depth information, about objects within a field of view (FOV). The depth sensors 620(2) may include range cameras, lidar systems, sonar systems, radar systems, structured light systems, stereo vision systems, optical interferometry systems, and so forth. The inventory management system 622 may use the 3D data acquired by the depth sensors 620(2) to identify objects, determine a location of an object in 3D real space, and so forth.

One or more buttons 620(3) may be configured to accept input from the user 616. The buttons 620(3) may comprise mechanical, capacitive, optical, or other mechanisms. For example, the buttons 620(3) may comprise mechanical switches configured to accept an applied force from a touch of the user 616 to generate an input signal. The inventory management system 622 may use data from the buttons 620(3) to receive information from the user 616. For example, the cart 618 may be configured with a button 620(3) to accept input from the user 616 and send information indicative of the input to the inventory management system 622.

The sensors 620 may include one or more touch sensors 620(4). The touch sensors 620(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 622 may use data from the touch sensors 620(4) to receive information from the user 616. For example, the touch sensor 620(4) may be integrated with the cart 618 to provide a touchscreen with which the user 616 may select from a menu one or more particular items 110 for picking, enter a manual count of items 110 at an inventory location 614, and so forth.

One or more microphones 620(5) may be configured to acquire information indicative of sound present in the environment. In some implementations, arrays of microphones 620(5) may be used. These arrays may implement beamforming techniques to provide for directionality of gain. The inventory management system 622 may use the one or more microphones 620(5) to acquire information from acoustic tags 706, accept voice input from the users 616, determine ambient noise level, and so forth.

The sensors 620 may include instrumented auto facing units (IAFUs) 620(6). The AFU 620(6) may comprise a position sensor configured to provide data indicative of displacement of a pusher. As an item 110 is removed from the AFU 620(6), the pusher moves, such as under the influence of a spring, and pushes the remaining items 110 in the AFU 620(6) to the front of the inventory location 614. By using data from the position sensor, and given item data 610 such as a depth of an individual item 110, a count may be determined, based on a change in position data. For example, if each item 110 is 1 inch deep, and the position data indicates a change of 7 inches, the quantity held by the AFU 620(6) may have changed by 7 items 110. This count information may be used to confirm or provide a cross check for a count obtained by other means, such as analysis of the weight sensor data.

The sensors 620 may include one or more optical sensors 620(7). The optical sensors 620(7) may be configured to provide data indicative of one or more of color or intensity of light impinging thereupon. For example, the optical sensor 620(7) may comprise a photodiode and associated circuitry configured to generate a signal or data indicative of an incident flux of photons. As described below, the optical sensor array 620(13) may comprise a plurality of the optical sensors 620(7). The optical sensors 620(7) may include photodiodes, photoresistors, photovoltaic cells, quantum dot photoconductors, bolometers, pyroelectric infrared detectors, and so forth. For example, the optical sensor 620(7) may use germanium photodiodes to detect infrared light.

One or more radio frequency identification (RFID) readers 620(8), near field communication (NFC) systems, and so forth, may be included as sensors 620. For example, the RFID readers 620(8) may be configured to read the RF tags 706. Information acquired by the RFID reader 620(8) may be used by the inventory management system 622 to identify an object associated with the RF tag 706 such as the item 110, the user 616, the cart 618, and so forth. For example, based on information from the RFID readers 620(8) detecting the RF tag 706 at different times and RFID readers 620(8) having different locations in the facility 602, a velocity of the RF tag 706 may be determined.

One or more RF receivers 620(9) may also be included as sensors 620. In some implementations, the RF receivers 620(9) may be part of transceiver assemblies. The RF receivers 620(9) may be configured to acquire RF signals 708 associated with Wi-Fi, Bluetooth, ZigBee, 2G, 3G, 4G, LTE, or other wireless data transmission technologies. The RF receivers 620(9) may provide information associated with data transmitted via radio frequencies, signal strength of RF signals 708, and so forth. For example, information from the RF receivers 620(9) may be used by the inventory management system 622 to determine a location of an RF source, such as a communication interface onboard the cart 618.

The sensors 620 may include one or more accelerometers 620(10), which may be worn or carried by the user 616, mounted to the cart 618, and so forth. The accelerometers 620(10) may provide information such as the direction and magnitude of an imposed acceleration. Data such as rate of acceleration, determination of changes in direction, speed, and so forth, may be determined using the accelerometers 620(10).

A gyroscope 620(11) may provide information indicative of rotation of an object affixed thereto. For example, the cart 618 or other objects may be equipped with a gyroscope 620(11) to provide data indicative of a change in orientation of the object.

A magnetometer 620(12) may be used to determine an orientation by measuring ambient magnetic fields, such as the terrestrial magnetic field. The magnetometer 620(12) may be worn or carried by the user 616, mounted to the cart 618, and so forth. For example, the magnetometer 620(12) mounted to the cart 618 may act as a compass and provide information indicative of which direction the cart 618 is oriented.

An optical sensor array 620(13) may comprise one or optical sensors 620(7). The optical sensors 620(7) may be arranged in a regular, repeating, or periodic two-dimensional arrangement such as a grid. The optical sensor array 620(13) may generate image data. For example, the optical sensor array 620(13) may be arranged within or below an inventory location 614 and obtain information about shadows of items 110, hand of the user 616, and so forth.

The sensors 620 may include proximity sensors 620(14) used to determine presence of an object, such as the user 616, the cart 618, and so forth. The proximity sensors 620(14) may use optical, electrical, ultrasonic, electromagnetic, or other techniques to determine a presence of an object. In some implementations, the proximity sensors 620(14) may use an optical emitter and an optical detector to determine proximity. For example, an optical emitter may emit light, a portion of which may then be reflected by the object back to the optical detector to provide an indication that the object is proximate to the proximity sensor 620(14). In other implementations, the proximity sensors 620(14) may comprise a capacitive proximity sensor 620(14) configured to provide an electrical field and determine a change in electrical capacitance due to presence or absence of an object within the electrical field.

The proximity sensors 620(14) may be configured to provide sensor data indicative of one or more of a presence or absence of an object, a distance to the object, or characteristics of the object. An optical proximity sensor 620(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 620 such as a camera 620(1). Based on an apparent distance between the features of the structured light pattern, the distance to the object may be calculated. Other techniques may also be used to determine distance to the object. In another example, the color of the reflected light may be used to characterize the object, such as skin, clothing, cart 618, and so forth.

The one or more weight sensors 620(15) are configured to measure the weight of a load, such as the item 110, the cart 618, or other objects. The weight sensors 620(15) may be configured to measure the weight of the load at one or more of the inventory locations 614, the cart 618, on the floor of the facility 602, and so forth. For example, the shelf may include a plurality of lanes or platforms, with one or more weight sensors 620(15) beneath each one to provide weight sensor data about an individual lane or platform. The weight sensors 620(15) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 620(15) may operate as transducers that generate one or more signals based on an applied force, such as that of the load due to gravity. For example, the weight sensor 620(15) may comprise a load cell having a strain gauge and a structural member that deforms slightly when weight is applied. By measuring a change in the electrical characteristic of the strain gauge, such as capacitance or resistance, the weight may be determined. In another example, the weight sensor 620(15) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 622 may use the data acquired by the weight sensors 620(15) to identify an object, determine a change in the quantity of objects, determine a location of an object, maintain shipping records, and so forth.

The sensors 620 may include other sensors 620(S) as well. For example, the other sensors 620(S) may include smart floors, light curtains, ultrasonic rangefinders, thermometers, barometric sensors, hygrometers, and so forth. For example, smart floors may utilize one or more of transmitters or receivers of electromagnetic signals positioned in or beneath a floor to determine one or more of location or identification of an object within the facility.

In some implementations, the camera 620(1) or other sensors 620(S) may include hardware processors, memory, and other elements configured to perform various functions. For example, the cameras 620(1) may be configured to generate image data, send the image data to another device such as the server 704, and so forth.

The facility 602 may include one or more access points 710 configured to establish one or more wireless networks. The access points 710 may use Wi-Fi, NFC, Bluetooth or other technologies to establish wireless communications between a device and the network 702. The wireless networks allow the devices to communicate with one or more of the sensors 620, the inventory management system 622, the tag 706, a communication device of the cart 618, or other devices.

Output devices 712 may also be provided in the facility 602. The output devices 712 are configured to generate signals, which may be perceived by the user 616 or detected by the sensors 620.

Haptic output devices 712(1) are configured to provide a signal that results in a tactile sensation to the user 616. The haptic output devices 712(1) may use one or more mechanisms such as electrical stimulation or mechanical displacement to provide the signal. For example, the haptic output devices 712(1) may be configured to generate a modulated electrical signal, which produces an apparent tactile sensation in one or more fingers of the user 616. In another example, the haptic output devices 712(1) may comprise piezoelectric or rotary motor devices configured to provide a vibration, which may be felt by the user 616.

One or more audio output devices 712(2) may be configured to provide acoustic output. The acoustic output includes one or more of infrasonic sound, audible sound, or ultrasonic sound. The audio output devices 712(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 712(3) may be configured to provide output, which may be seen by the user 616 or detected by a light-sensitive sensor such as a camera 620(1) or an optical sensor 620(7). In some implementations, the display devices 712(3) may be configured to produce output in one or more of infrared, visible, or ultraviolet light. The output may be monochrome or in color. The display devices 712(3) may be one or more of emissive, reflective, microelectromechanical, and so forth. An emissive display device 712(3), such as using LEDs, is configured to emit light during operation. In comparison, a reflective display device 712(3), such as using an electrophoretic element, relies on ambient light to present an image. Backlights or front lights may be used to illuminate non-emissive display devices 712(3) to provide visibility of the output in conditions where the ambient light levels are low.

The display devices 712(3) may be located at various points within the facility 602. For example, the addressable displays may be located on inventory locations 614, carts 618, on the floor of the facility 602, and so forth.

Other output devices 712(P) may also be present. For example, the other output devices 712(P) may include scent/odor dispensers, document printers, 3D printers or fabrication equipment, and so forth.

Figure 8:
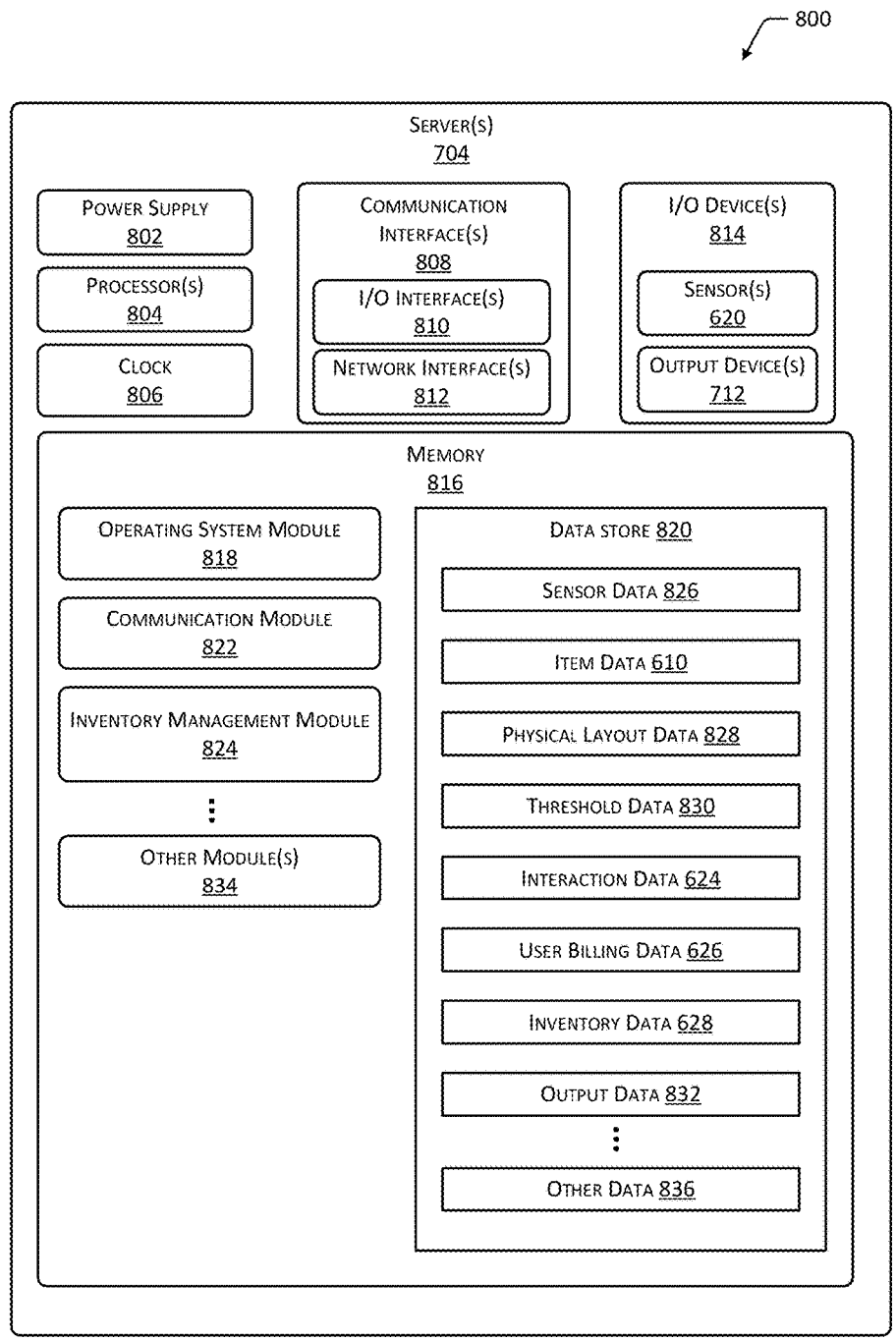
FIG. 8 is a block diagram of a server to support operation of the facility, according to some implementations.

FIG. 8 illustrates a block diagram 800 of a server 704 configured to support operation of the facility 602, according to some implementations. The server 704 may be physically present at the facility 602, may be accessible by the network 702, or a combination of both. The server 704 does not require end-user knowledge of the physical location and configuration of the system that delivers the services. Common expressions associated with the server 704 may include "on-demand computing", "software as a service (SaaS)", "platform computing", "network-accessible platform", "cloud services", "data centers", and so forth. Services provided by the server 704 may be distributed across one or more physical or virtual devices.

One or more power supplies 802 may be configured to provide electrical power suitable for operating the components in the server 704. The one or more power supplies 802 may comprise batteries, capacitors, fuel cells, photovoltaic cells, wireless power receivers, conductive couplings suitable for attachment to an external power source such as provided by an electric utility, and so forth. The server 704 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The server 704 may include one or more communication interfaces 808 such as input/output (I/O) interfaces 810, network interfaces 812, and so forth. The communication interfaces 808 enable the server 704, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 620, keyboard, mouse, scanner, and so forth. The I/O devices 814 may also include output devices 712 such as one or more of a display device 712(3), printer, audio speakers, and so forth. In some embodiments, the I/O devices 814 may be physically incorporated with the server 704 or may be externally placed.

The network interfaces 812 may be configured to provide communications between the server 704 and other devices, such as the carts 618, routers, access points 710, and so forth. The network interfaces 812 may include devices configured to couple to personal area networks (PANs), local area networks (LANs), wireless local area networks (WLANS), wide area networks (WANs), and so forth. For example, the network interfaces 812 may include devices compatible with Ethernet, Wi-Fi, Bluetooth, ZigBee, and so forth.

The server 704 may also include one or more busses or other internal communications hardware or software that allow for the transfer of data between the various modules and components of the server 704.

As shown in FIG. 8, the server 704 includes one or more memories 816. The memory 816 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 816 provides storage of computer-readable instructions, data structures, program modules, and other data for the operation of the server 704. A few example functional modules are shown stored in the memory 816, although the same functionality may alternatively be implemented in hardware, firmware, or as a system on a chip (SoC).

The memory 816 may include at least one operating system (OS) module 818. The OS module 818 is configured to manage hardware resource devices such as the I/O interfaces 810, the I/O devices 814, the communication interfaces 808, and provide various services to applications or modules executing on the processors 804. The OS module 818 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 816 may be a data store 820 and one or more of the following modules. These modules may be executed as foreground applications, background tasks, daemons, and so forth. The data store 820 may use a flat file, database, linked list, tree, executable code, script, or other data structure to store information. In some implementations, the data store 820 or a portion of the data store 820 may be distributed across one or more other devices including the servers 704, network attached storage devices, and so forth.

A communication module 822 may be configured to establish communications with one or more of the carts 618, sensors 620, display devices 712(3), other servers 704, or other devices. The communications may be authenticated, encrypted, and so forth.

The memory 816 may store an inventory management module 824. The inventory management module 824 is configured to provide the inventory management functions as described herein with regard to the inventory management system 622. For example, the inventory management module 824 may track items 110 between different inventory locations 614, to and from the carts 618, and so forth. The inventory management module 824 may access sensor data 826 from one or more sensors 620 during operation. For example, the sensor data 826 may include the output data 160. Sensor data 826 from a single sensor 620 may be used, or may be combined using one or more sensor fusion techniques during operation.

Information used by the inventory management module 824 may be stored in the data store 820. For example, the data store 820 may store the item data 610, physical layout data 828, threshold data 830, interaction data 624, user billing data 626, inventory data 628, output data 832, and so forth.

The inventory management module 824 may utilize physical layout data 828 during operation. The physical layout data 828 may provide information indicative of where weight sensors 620(15), other sensors 620(S), inventory locations, and so forth are in the facility with respect to one another. For example, the physical layout data 828 may comprise information representative of a map or floor plan of the facility with relative positions of inventory locations, associated weight sensors 620(15), sensors 620, planogram data indicative of how items 110 are to be arranged at the inventory locations, and so forth.

The physical layout data 828 may associate a particular inventory location identifier (ID) with other information such as physical location data, sensor position data, sensor direction data, sensor identifiers, and so forth. The physical location data provides information about where in the facility objects are, such as the inventory location, the sensors 620, and so forth. In some implementations, the physical location data may be relative to another object. For example, the physical layout data 828 may indicate that the output data 160 is associated with the lane 1 of inventory location 614.

The inventory management module 824 may utilize this information during operation. For example, the inventory management module 824 may utilize physical layout data 828 to determine what sensor data 826 acquired from the detection systems 104 corresponds to a particular shelf, lane, or other inventory location 614.

The inventory management module 824 may process the sensor data 826 and generate output data 832. For example, the sensor data 826 comprises information acquired by one or more of the sensors 620. The threshold data 830 may comprise one or more thresholds. For example, the threshold value may specify a minimum quantity value below which a restocking order is generated. The output data 832 may then comprise a restocking order. In other implementations, the inventory management module 824 may generate the user billing data 626, which may be used to generate an invoice to the user 616.

Other modules 834 may also be present in the memory 816 as well as other data 836 in the data store 820. For example, the other modules 834 may include a billing module.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the system and techniques described above can be utilized in a variety of devices, environments, and situations. For example, the marks 138 may be placed on a user 616 or other object and used to obtain motion capture data. In another example, the marks 138 may be placed on particular objects or targets and may be used to provide for annotation, registration, calibration, or other operations associated with computer vision, machine learning, and so forth. The systems and techniques allow for the marks 138 to be read while suppressing or omitting the background.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a continuous inkjet printer configured to produce a mark with a single pass using an ink, the ink comprising:
a dye that upon excitation at a wavelength of between 800 nanometers and 830 nanometers fluoresces at a wavelength of between 840 and 860 nanometers;
rutile titanium dioxide particles that reflect infrared light with a wavelength of between 800 and 870 nanometers; and
a first computing device comprising:
a first memory, storing first computer-executable instructions; and
a hardware processor to execute the first computer-executable instructions to:
direct the continuous inkjet printer to print the mark on an item using the ink.

2. The system of claim 1, wherein the titanium dioxide particles have an average size of between 405 nm and 425 nm.

3. The system of claim 1, the ink further comprising a resin.

4. The system of claim 1, wherein the rutile titanium dioxide particles are encapsulated within a polymer.

5. A system comprising:
an ink comprising:
a dye that upon excitation at a wavelength of between 800 nanometers and 830 nanometers fluoresces at a wavelength of between 840 and 860 nanometers;
a first material that reflects infrared light with a wavelength of between 800 and 870 nanometers, wherein the first material comprises particles having an average size of between 405 nm and 425 nm;
a tank to contain the ink;
a first device to deposit the ink on a surface of an item; and
a first computing device comprising:
a first memory, storing first computer-executable instructions; and
a hardware processor to execute the first computer-executable instructions to:
direct the first device to form a mark on the item using the ink.

6. The system of claim 5, wherein the first material comprises titanium dioxide.

7. The system of claim 5, the ink further comprising a resin.

8. The system of claim 5, wherein the first material comprises one or more metals.

9. The system of claim 5, wherein the first device comprises one or more of:
a continuous inkjet printhead, or
a drop-on-demand printhead.

10. The system of claim 5, further comprising:
a second device to deposit a reflective material on the surface of the item;
a computing device in communication with the first device and a second device, wherein the computing device directs the second device to deposit the reflective material on the surface of the item and then directs the first device to deposit the ink on top of the reflective material.

11. The system of claim 10, wherein the reflective material comprises one or more of:
titanium dioxide particles encapsulated within a polymer, or
a mixed metal oxide encapsulated within the polymer.

12. The system of claim 10, the second device comprising one or more of:
a spray nozzle to spray the reflective material onto the surface of the item; or
a roller comprising a roller frame that supports a roller cover, wherein the roller cover rotates with respect to the roller frame, absorbs at least a portion of the reflective material, and transfers at least a portion of the reflective material to the surface of the item.

13. A method comprising:
placing ink on a surface of an item, the ink comprising:
a dye that fluoresces to emit photons in a first range of wavelengths when excited by incident photons at a second range of wavelengths; and
a reflective material that reflects at least some photons within each of the first range of wavelengths and the second range of wavelengths, wherein the reflective material comprises particles having an average size of between 405 nanometers and 425 nanometers.

14. The method of claim 13, wherein the first range of wavelengths extends from 840 nanometers to 860 nanometers and the second range of wavelengths extends from 800 to 830 nanometers; and wherein the ink, after placement on the surface of the item, exhibits a transmittance of greater than 80% to visible light.

15. The method of claim 13, wherein the dye exhibits an excitation wavelength that differs from the emission wavelength by at least 30 nanometers.

16. The method of claim 13, wherein the reflective material comprises titanium dioxide.

17. The method of claim 13, the ink further comprising a resin.

18. The method of claim 13, wherein the reflective material comprises one or more metals.

19. The method of claim 13, further comprising:
placing, before the ink, a second reflective material on the surface of the item; and
wherein at least a portion of the ink is placed atop the reflective material.

20. The method of claim 19, wherein the second reflective material comprises titanium dioxide.

* * * * *

UNITED STATES PATENT AND TRADEMARK OFFICE
CERTIFICATE OF CORRECTION

| | | |
|---|---|---|
| PATENT NO. | : 10,311,760 B1 | Page 1 of 1 |
| APPLICATION NO. | : 15/707933 | |
| DATED | : June 4, 2019 | |
| INVENTOR(S) | : Nicholas Charles McMahon et al. | |

It is certified that error appears in the above-identified patent and that said Letters Patent is hereby corrected as shown below:

In the Claims

In Claim 10 Column 26, Line 19:
Reads "and a second device".
When it should read --and the second device--.

Signed and Sealed this
Twenty-third Day of July, 2019

Andrei Iancu
*Director of the United States Patent and Trademark Office*